(12) United States Patent
Uchiyama (10) Patent No.: US 7,196,721 B2
(45) Date of Patent: Mar. 27, 2007

(54) INFORMATION PROCESSING METHOD AND APPARATUS, AND RECORDING MEDIUM

(75) Inventor: Shinji Uchiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1011 days.

(21) Appl. No.: 10/357,340

(22) Filed: Feb. 4, 2003

(65) Prior Publication Data

US 2003/0151665 A1    Aug. 14, 2003

(30) Foreign Application Priority Data

Feb. 14, 2002    (JP)    ............................. 2002-037040

(51) Int. Cl.
*H04N 17/00*    (2006.01)
(52) U.S. Cl. ..................................... 348/187
(58) Field of Classification Search ............... 348/187, 348/188
See application file for complete search history.

(56) References Cited

U.S. PATENT DOCUMENTS

| | | | | |
|---|---|---|---|---|
| 5,298,993 | A * | 3/1994 | Edgar et al. ................ | 348/180 |
| 5,444,799 | A | 8/1995 | Hirono et al. ............... | 382/287 |
| 5,570,190 | A | 10/1996 | Terawaki et al. ........... | 356/400 |
| 6,816,187 | B1 * | 11/2004 | Iwai et al. .................... | 348/187 |
| 2001/0010514 | A1 | 8/2001 | Ishino ......................... | 345/158 |
| 2002/0010384 | A1 * | 1/2002 | Shahidi et al. .............. | 600/118 |
| 2002/0067855 | A1 * | 6/2002 | Chiu et al. .................. | 382/199 |
| 2004/0170315 | A1 * | 9/2004 | Kosaka et al. .............. | 382/154 |

FOREIGN PATENT DOCUMENTS

| | | |
|---|---|---|
| JP | 61-277011 | 12/1986 |
| JP | 05-274426 | 10/1993 |
| JP | 06-137840 | 5/1994 |
| JP | 6-175715 | 6/1994 |
| JP | 6-325154 | 11/1994 |
| JP | 7-035644 | 2/1995 |
| JP | 7-98214 | 4/1995 |
| JP | 11-066312 | 3/1999 |
| JP | 2001-325069 | 11/2001 |

OTHER PUBLICATIONS

A Versatile Camera Calibration Technique for High-Accuracy 3D Machine Vision Metrology using Off-the-Shelf TV Cameras and Lenses, IEEE Journal of Robotics and Automation, vol. RA-3, No. 4 (Aug. 1987, pp. 323 to 344).
U.S. Appl. No. 09/506,382, filed Feb. 18, 2002, Kiyohide Sato et al.

* cited by examiner

*Primary Examiner*—Ngoc-Yen Vu
*Assistant Examiner*—Dillon Durnford-Geszvain
(74) *Attorney, Agent, or Firm*—Fitzpatrick, Cella, Harper & Scinto (57)    ABSTRACT

A method of setting an internal parameter or an external parameter of a camera is provided. In this method, there is acquired a picked-up image obtained by picking up a calibration pattern in which black pattern elements and black-and-white pattern elements are arranged on a plane using the camera. Then, a black continuation area and a white continuation area are obtained by quantizing the picked-up image, the black pattern elements and the black-and-white pattern elements in the picked-up image are judged from each other based on the obtained black area and white area, the pattern elements in the picked-up image are associated with the pattern elements in a space based on an arrangement relationship between the judged black pattern elements and black-and-white pattern elements, and the internal parameter or the external parameter is set.

8 Claims, 7 Drawing Sheets

INFORMATION PROCESSING METHOD AND APPARATUS, AND RECORDING MEDIUM

BACKGROUND OF THE INVENTION

1. Field of the Invention

The present invention relates to setting of an internal parameter or an external parameter of a camera.

2. Related Background Art

In order to calibrate an internal parameter, such as a focal distance or a principal point, of a camera or an external parameter that is the positional posture of the camera, there is used a method in which a plurality of fiducial points (marks), which are arranged in a three-dimensional space coordinate system and whose coordinate values are already known, are picked up with the camera and an estimation is performed based on a camera calibration algorithm using the space coordinate value and image coordinate value of each mark.

In order to use this method, it is required to associate the space coordinate value of each mark with the image coordinate value thereof. Therefore, there is used a method in which this associating operation is manually performed through human judgment of a mark image. Alternatively, there is used a method in which the associating operation is automatically performed using an image processing technique. In the camera calibration algorithm, there is used a method that is based on marks not all of which are distributed on one plane (meaning that the marks are three-dimensionally distributed) or a method that is based on marks that are two-dimensionally distributed (on a plane). These methods are widely and generally used because of their advantages. For instance, it is possible to arrange marks in a space with ease. Also, it is possible to evolve these methods to a method in which it is also possible to perform calibration of a lens distortion that is a non-linear internal parameter.

This was proposed by Roger Y. Tsai et al. in old times (see Roger Y. Tsai, "A versatile Camera Calibration Technique for High-Accuracy 3D Machine Metrology Using Off-the Shelf TV Cameras and Lenses", IIIE J. Robotics and Automation, Vol. RA-3, No. 4, pp. 323 to 344, 1987). Aside from this, a large number of proposals are made in Japanese Patent Application Laid-open Nos. 06-137840, 2001-325069, and the like.

As a method of associating the space coordinate value of each mark with the image coordinate value thereof in the case where this camera calibration method is used, there is a method in which the marks are prepared as a pattern having a specific regularity and the pattern is recognized on an image, thereby automatically performing the associating operation. As the pattern to be used, there are proposed a pattern, in which black circles or ellipses are arranged on a white background in a lattice manner, and a pattern constructed from two or more sets of parallel straight lines (for instance, a checkered pattern (Japanese Patent Application Laid-open No. 05-274426 (U.S. Pat. No. 5,444,799), Japanese Patent Application Laid-open No. 07-98214)).

It is possible to use these methods in the case where it is assumed that the whole pattern is picked up or in the case where although only a part of the pattern is picked up, it is not required to specify which area of the whole pattern is picked up.

In the case where the positional posture of a camera is to be estimated, however, it is required to obtain the positional posture by using a specific position of a pattern in a space as a reference. Therefore, there has been formerly pointed out a problem in that in the case where only a partial area of the pattern is picked up or in the case where the visual axis of a camera with respect to the pattern is completely uncertain, it is impossible to specify an area of the pattern in the space to which the partial area of the pattern in a picked-up image corresponds. As a method of solving this problem, there is disclosed in Japanese Patent Application Laid-open No. 06-137840 a method in which some of elements of a pattern are replaced with directional elements, thereby making it possible to specify an area of the pattern (hereinafter referred to as the "Prior Art A"). In this method, some of circular elements constituting the pattern are replaced with directional elements (elliptic elements, for instance) and distinguishing between the pattern elements is performed using the differences in shape and directional property, thereby specifying a picked-up area.

Also, there is a method in which in the case where a pattern including sets of parallel straight lines is used, within each area surrounded by parallel straight lines (each rectangular square constituting a checkered pattern, for instance), a pattern that is different from the checkered pattern is disposed and the patterns are recognized through pattern recognition processing, thereby specifying a partial area (hereinafter referred to as the "Prior Art B").

Further, there is a method in which a partial area of a pattern is specified by applying different colors to respective pattern elements and combining color recognition processing with pattern spatial feature recognition processing (hereinafter referred to as the "Prior Art C").

In the case of the prior art A, at the time of judgment through distinguishing of the directional pattern elements from other pattern elements, it is required to perform this judgment using the difference in shape on an image. This leads to a problem in that because the shape of the pattern in a picked-up image changes due to changing of the positional relation between the camera and the pattern, errors tend to occur in the pattern element judgment due to errors in shape recognition. This problem becomes particularly prominent in the case where circles and ellipses are used as in the case of Japanese Patent Application Laid-open No. 06-137840.

In the case of the prior art B, it is required that a different pattern newly provided to specify a partial area of a pattern is captured by a camera with a sufficient size, so that the density of the parallel straight line sets applied to camera calibration is lowered. In order to perform camera calibration, it is more advantageous that marks are widely distributed on an image and as many marks as possible are used, so that the lowering of the density of the parallel straight line sets that function as marks becomes a problem.

In the case of the prior art C, both of the two problems described above are solved. However, the extraction of color areas is generally unstable in comparison with binarizing processing by lightness, which leads to a problem in that there occurs erroneous detection of pattern elements.

SUMMARY OF THE INVENTION

The present invention has been made in view of the problems described above and is aimed at, in the case where only a partial area of a pattern is picked up at the time of camera calibration using the pattern, enabling specification of a picked-up area of the pattern with stability without causing a reduction in the number of marks in the pattern.

In order to achieve the object described above, the present invention is characterized by including the following constructions.

Under the object described above, according to one embodiment of the present application, an information processing method, in which one of an internal parameter and an external parameter of a camera is set, includes:

acquiring a picked-up image obtained by picking up a calibration pattern in which black pattern elements and black-and-white pattern elements are arranged on a plane using the camera, each of the black pattern elements having a dark closed area in a bright background area, each of the black-and-white pattern elements having a dark closed area and a bright closed area inside the dark closed area;

obtaining a black continuation area and a white continuation area by quantizing the picked-up image;

judging between the black pattern elements and the black-and-white pattern elements in the picked-up image based on the black continuation area and the white continuation area which are obtained; and setting one of the internal parameter and the external parameter by associating the pattern elements in the picked-up image with the pattern elements in a space based on an arrangement relationship between the black pattern elements and the black-and-white pattern elements which are judged.

Further, under the object described above, according to another embodiment of the present application, an information processing method, in which one of an internal parameter and an external parameter of a camera is set, includes:

acquiring a picked-up image obtained by picking up a calibration pattern in which white pattern elements and white-and-black pattern elements are arranged on a plane using the camera, each of the white pattern elements having a bright closed area in a dark background area, each of the white-and-black pattern elements having a bright closed area and a dark closed area inside the bright closed area;

obtaining a white continuation area and a black continuation area by binarizing the picked-up image;

judging between the white pattern elements and the white-and-black pattern elements in the picked-up image based on the white continuation area and the black continuation area which are obtained; and setting one of the internal parameter and the external parameter of the camera by associating the pattern elements in the picked-up image with the pattern elements in a space based on an arrangement relationship between the white pattern elements and the white-and-black pattern elements which are judged.

Further, under the object described above, according to another embodiment of the present application, an information processing method, in which one of an internal parameter and an external parameter of a camera is set, includes:

acquiring a picked-up image obtained by picking up a calibration pattern in which first pattern elements and second pattern elements are arranged using the camera, each of the first pattern elements being expressed by two closed areas having different brightness, each of the second pattern elements being expressed by one closed area;

quantizing a signal expressing brightness in the picked-up image and detecting the first pattern elements and the second pattern elements based on a result of the quantization;

associating the pattern elements in the picked-up image with the pattern elements in a space based on an arrangement of the first pattern elements shown by a result of the detection; and setting one of the internal parameter and the external parameter of the camera based on a result of the associating operation.

Other objects and characteristics of the present invention will be apparent from the following embodiments and the accompanying drawings.

DESCRIPTION OF THE PREFERRED EMBODIMENTS

Hereinafter, preferred embodiments of the present invention for calibrating internal parameters, such as the focal distance and the principal point, of a camera or external parameters, such as the positional posture, of the camera will be described with reference to the accompanying drawings.

First Embodiment

Figure 1:
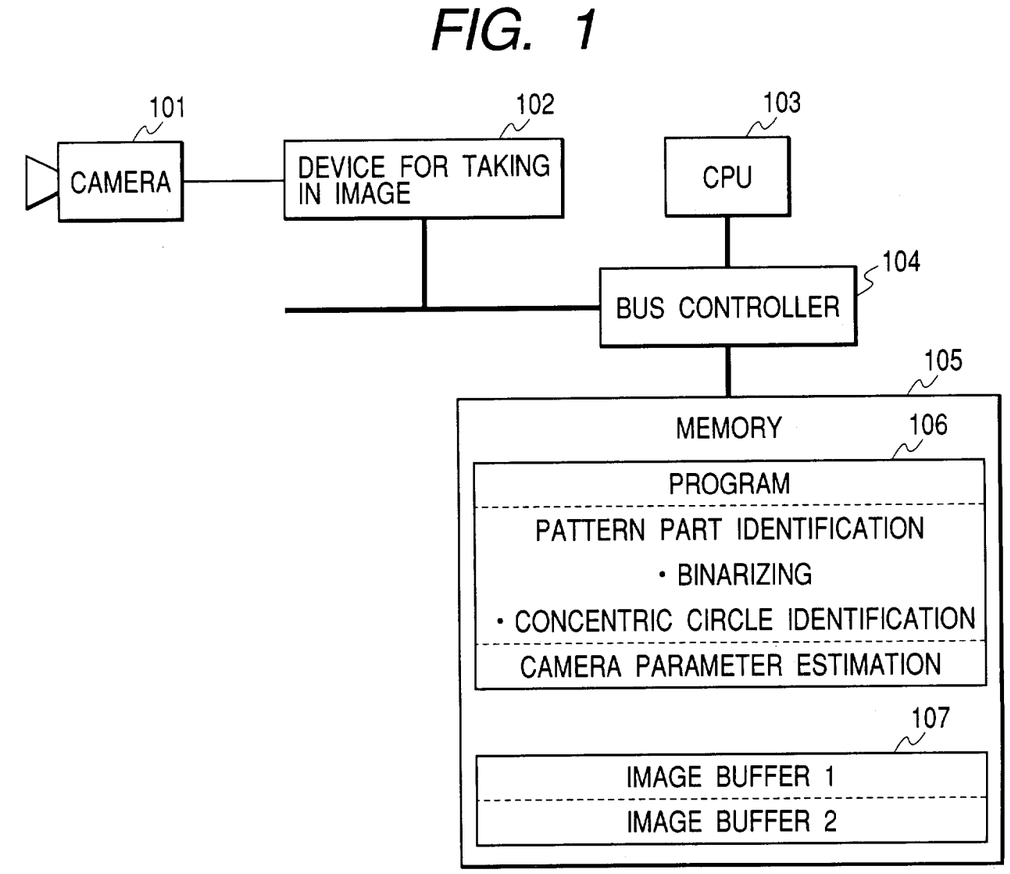
FIG. 1 is a block diagram showing the construction of a camera calibration apparatus according to a first embodiment.

The outline of the first embodiment will be described below. FIG. 1 is a block diagram showing the first embodiment of the present invention.

Figure 5:
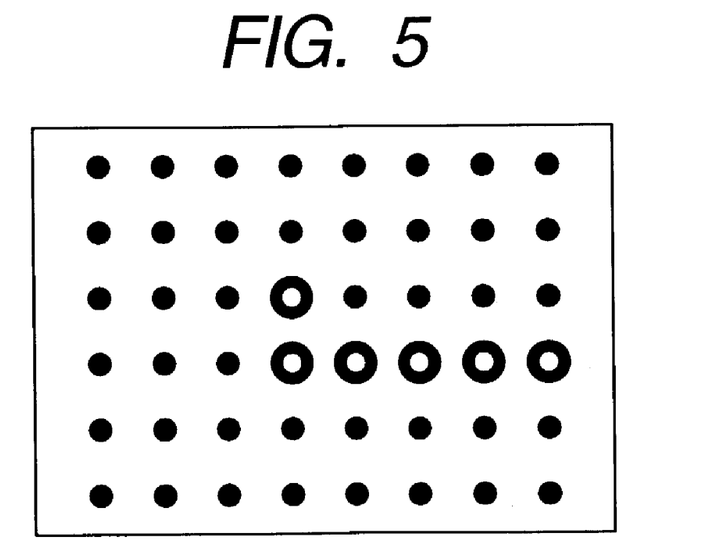
FIG. 5 shows a pattern used in the first embodiment.

Reference numeral 101 denotes a camera that picks up a pattern on a plane shown in FIG. 5. This picked-up image is outputted to a device for taking an image 102 as an image signal. Reference numeral 102 represents the device for taking an image that receives input of the image signal from the camera 101 and writes an image into an image buffer 107 under adjustment by a bus controller 104. Reference numeral 103 denotes a CPU that performs processing in accordance with a processing procedure described in a program 106. Reference numeral 104 specifies the bus controller that performs adjustment of data input and output among the CPU 103, the device for taking an image 102, and a memory 105. Reference numeral 105 denotes the memory in which data, such as the processing procedure and the image, are stored. Reference numeral 106 represents the program that is stored in the memory 105 and describes the processing procedure. This program is, for instance, a program for realizing the processing procedure shown in FIGS. 2 and 3. Reference numeral 107 denotes the image buffer (first image buffer and second image buffer) which holds the image prepared in the memory 105, the image obtained by the device for taking an image 102, and an image obtained as a result of processing by the CPU 103.

Figure 2:
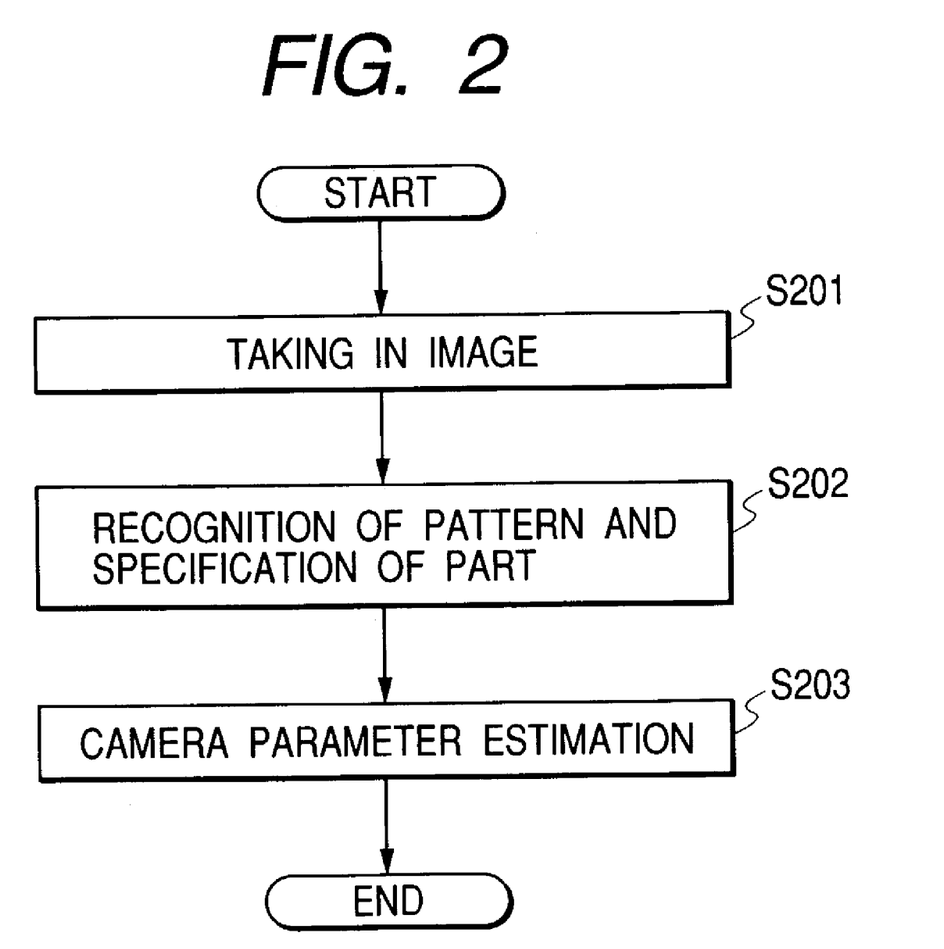
FIG. 2 is a flowchart illustrating the outline of a processing procedure of a camera calibration method.

The outline of a processing procedure in a camera calibration apparatus having the construction shown in the block diagram in FIG. 1 will be described with reference to a flowchart shown in FIG. 2.

In step S201, the pattern shown in FIG. 5 is picked up with the camera 101 and a picked-up image is taken-in by the device for taking an image 102.

Figure 4:
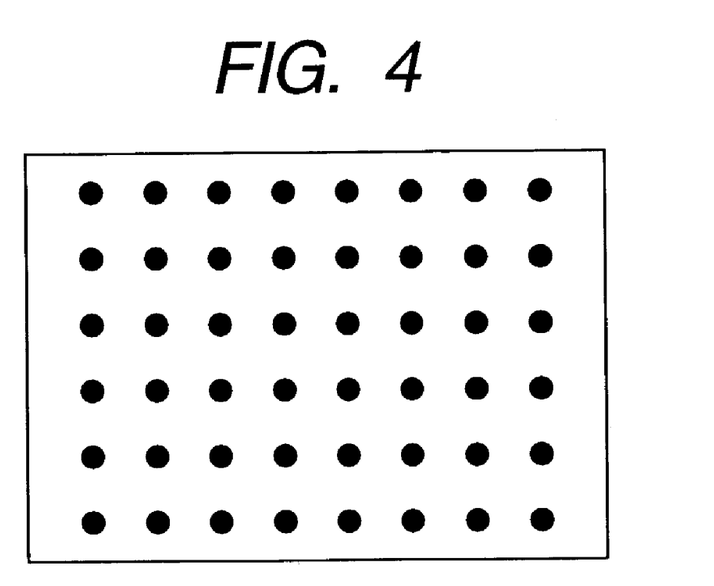
FIG. 4 shows an example of a pattern that has conventionally been used.

In contrast to a conventionally used pattern shown in FIG. 4 that is a pattern in which black circular pattern elements functioning as marks are arranged in a regular manner, the pattern used in this embodiment shown in FIG. 5 is a pattern in which some of black circular pattern elements are replaced with pattern elements that concentrically have white circle areas within black circle areas.

The image taken-in in step S201 is accumulated in the first image buffer 107. Next, in step S202, recognition of the pattern and specification of a part of the pattern are performed based on the image. In step S203, by using a result of this processing, estimation of a camera parameter is performed. As to this camera parameter estimation, it is possible to use a method in which vanishing points are calculated based on positions of the pattern elements in the image and a focal distance is obtained, for instance. Here, there are many applicable methods such as the methods described in the section "Related Background Art" of this specification. For instance, it is also possible to use the procedure described in Japanese Patent Application Laid-Open No. 06-137840 or Japanese Patent Application Laid-open No. 2001-325069 for performing estimation of a camera positional posture.

The feature of this embodiment is processing performed in step S202 in which space coordinate values of the pattern elements (marks) contained in the pattern are associated with image coordinate values of the pattern elements picked up in the image.

Figure 3:
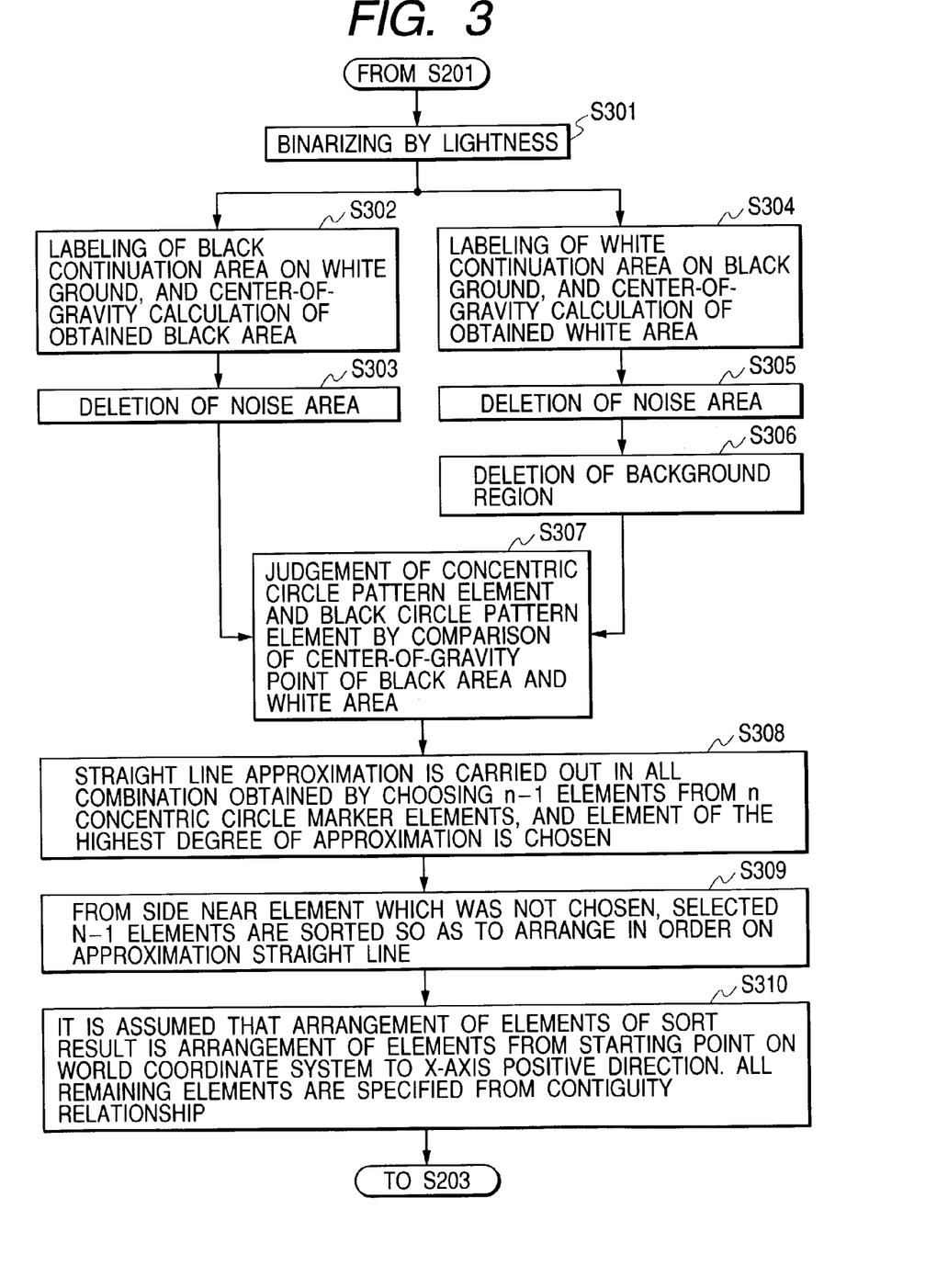
FIG. 3 is a flowchart showing a method of recognizing and specifying a partial area of a pattern with a camera calibration method according to the first embodiment.

Hereinafter, the processing procedure in this step S202 will be described in more detail with reference to a flowchart shown in FIG. 3.

In step S301, quantization processing (binarizing processing) by lightness of each pixel of the image is performed using a preset threshold value. Here, if it is possible to perform this quantization with stability, there may be used another method in which, for instance, an optimum threshold value is dynamically determined by obtaining a histogram of the image.

A binary image obtained as a result of this processing is accumulated in the second image buffer 107. Next, in step S302, by regarding each white area as a background area and regarding each black area as an area of interest, there is performed detection of the continuation area of each pixel of interest, that is, detection of each black area. This is image labeling processing that is widely and generally performed at the time of image processing. Further, concurrently with this processing, center-of-gravity points are calculated. In the course of detection of the continuation area, the pixel contained in each area is specified, so that it is possible to calculate the center-of-gravity point of the continuation area with ease.

Each continuation area obtained as a result of the labeling, whose size is small, is regarded as noise occurring at the time of image taking-in and this area is deleted in step S303.

As a result of the processing procedure in steps S301, S302, and S303 described above, there is detected each black area resulting from a black circle pattern element and a concentric circle pattern element existing in the pattern.

Also, in step S304, by regarding each black area as a background area and regarding each white area as an area of interest, there is performed detection of the continuation area of each pixel of interest, that is, detection of each white area. Like in step S302, there is also performed calculation of the center-of-gravity point of the white area. Then, like in step S303, each area having a small size is deleted in step S305. Further, in step S306, an area having the maximum number of pixels among the detected white areas is found and this area is deleted as a white background area. In this method, the white area that is a background of the pattern becomes extremely large as compared with other white areas, so that it becomes possible to find and delete the background white area with ease and in a robust manner.

As a result of the processing procedure in steps S301, S304, S305, and S306 described above, there is detected each white area resulting from a white circle in the center portion of a concentric circle marker element in the pattern.

As a result of the processing described above, there are detected each black area and each white area resulting from the pattern elements and the center-of-gravity points thereof based on the image in which the pattern has been picked up. By using a result of this detection, judgment of the concentric circle pattern elements and the black circle pattern elements is performed in step S307. Here, in the case of the black area and white area of a concentric circle, the center-of-gravity points of these two areas become the same point in an ideal case. Therefore, in this step S307, by finding each black area, whose center-of-gravity point is sufficiently close to the center-of-gravity points of all the white areas, it is judged whether the black area is a black area of a concentric circle pattern element or a black area of a black circle pattern element. This judgment method is extremely robust and is significantly low in calculation cost in comparison with a conventional judgment method based on the shapes of black areas.

In step S307, further, based on a result of this judgment, the position of each black circle pattern element in the image is set as the center-of-gravity point of a black area resulting from a black circle pattern element and the position of each concentric circle pattern element in the image is set as the center-of-gravity point of a white area in the center portion of the concentric circle pattern element.

It should be noted here that as to the position of each concentric circle pattern element in the image, the white area and the black area resulting from each concentric circle pattern element may be combined with each other and be regarded as a single area, and the position of the concentric circle pattern element may be set at the center-of-gravity point of the single area.

As a result of the processing up to step S307, the position of each concentric circle pattern element in the image and the position of each black circle pattern element in the image are specified. By performing the following processing using a result of this processing, there is performed identification of a picked-up area of the pattern.

As shown in FIG. 5, the concentric circle pattern elements are arranged on a straight line in one direction starting from a center point and one concentric circle pattern element is further arranged at an adjacent lattice point position orthogonal to the straight line at the center point. Accordingly, also in the image, detected concentric circle pattern elements should be arranged on a straight line except for the last one element. Therefore, in step S308, −1 pattern elements are chosen from n concentric circle pattern elements and there is carried out a straight line approximation calculation of positions of the chosen elements. Then, a combination having the highest degree of approximation with respect to the straight line is chosen from all of the −1 pattern element combinations. Here, the position of the concentric circle pattern element that was not chosen is set as "Q".

In step S309, from a side near the element Q which was not chosen, selected −1 elements are sorted so as to arrange in order on an approximation straight line, and the sorted elements are respectively set as "P1", "P2", . . . , and "Pn−1".

As a result of the procedure in steps S308 and S309, it becomes possible to perform identification of an area of the picked-up image to which the concentric circle pattern elements in the pattern shown in FIG. 5 correspond. However, it is required that three or more concentric circle patterns in proximity to the center among the concentric circle patterns arranged on the straight line are captured in the image.

By using a result of the specification of the concentric circle pattern elements, specification of the black circle pattern elements is next performed in S310. In this step S310, P1 is set as an origin of the coordinate system of the pattern, a direction from P1, through P2, P3, . . . , to Pn−1 is set as an X-axis positive direction, a direction from P1 to Q is set as a Y-axis positive direction, and the identification of black circle pattern elements is performed based on the contiguity relationships and distances between the pattern elements in the image.

As has been described above, according to the first embodiment, during camera calibration using a pattern, even in the case where only a partial area of the pattern is picked up, it becomes possible to specify the picked-up area of the pattern with stability without reducing the number of marks in the pattern.

Second Embodiment

Figure 6:
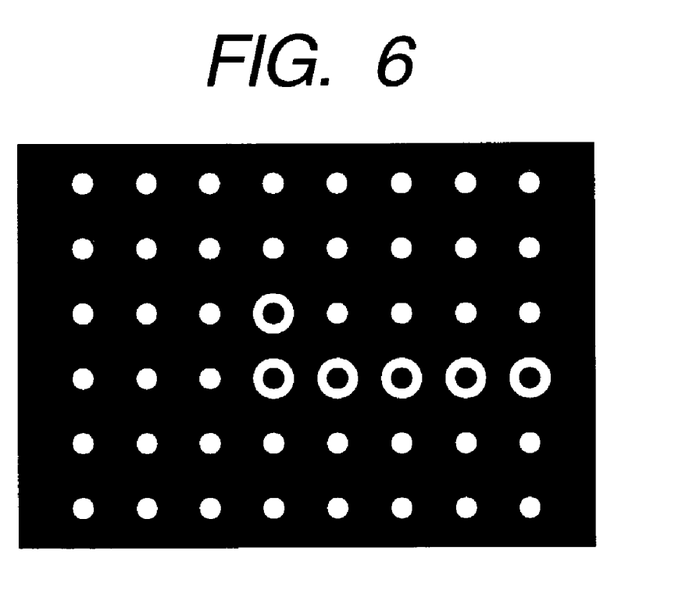
FIG. 6 shows an example of a pattern used in a second embodiment.

The pattern to be used is not limited to the pattern in which black circle pattern elements and concentric circle pattern elements are arranged on a white background. For instance, there may be used a pattern shown in FIG. 6 in which white circle pattern elements and concentric circle pattern elements that concentrically have black circles in white circles are arranged on a black background. In this case, the processing procedure in steps S302 to S307 in the first embodiment is carried out by changing the word "white" to "black" and the word "black" to "white".

Third Embodiment

The arrangement of the black circle pattern elements and the concentric circle pattern elements is not limited to the arrangement shown in FIG. 5 related to the first embodiment. That is, these elements may be arranged with any other regularity so long as the concentric circle patterns are arranged while maintaining a specific regularity with respect to the black circles.

Figure 7:
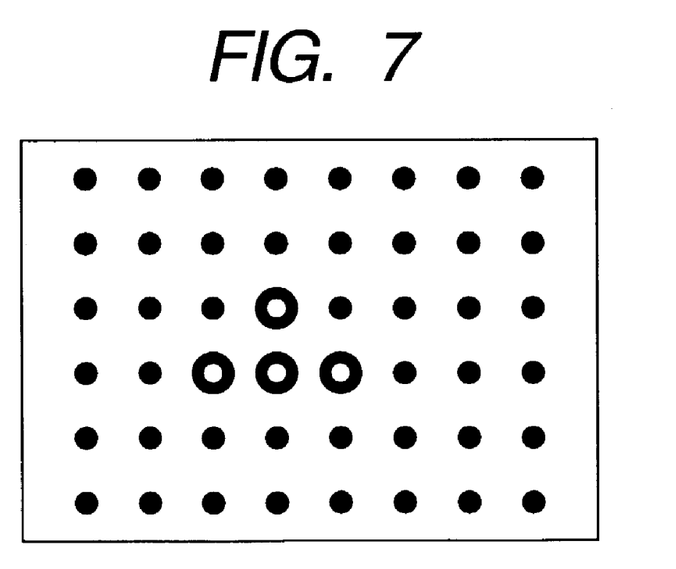
FIG. 7 shows an example of a pattern used in a third embodiment.
Figure 8:
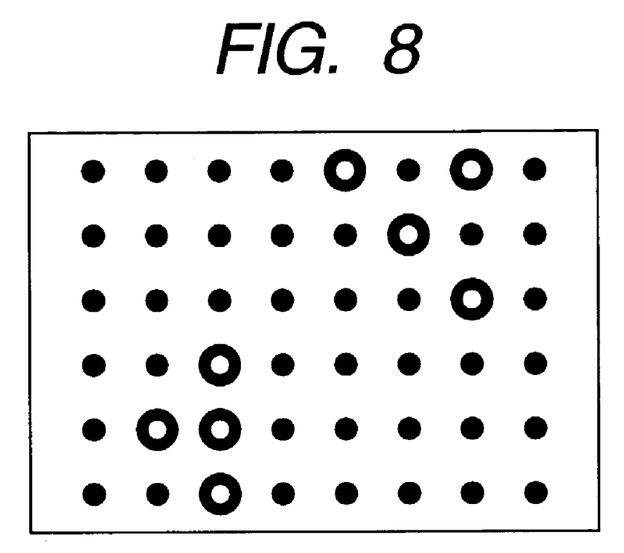
FIG. 8 shows another example of the pattern used in the third embodiment.

For instance, the elements may be arranged in a manner shown in FIG. 7 or arranged in a manner shown in FIG. 8. In this case, the judgment method used in steps S308 to S310 of the processing procedure carried out in the first embodiment is changed.

Fourth Embodiment

Figure 9:
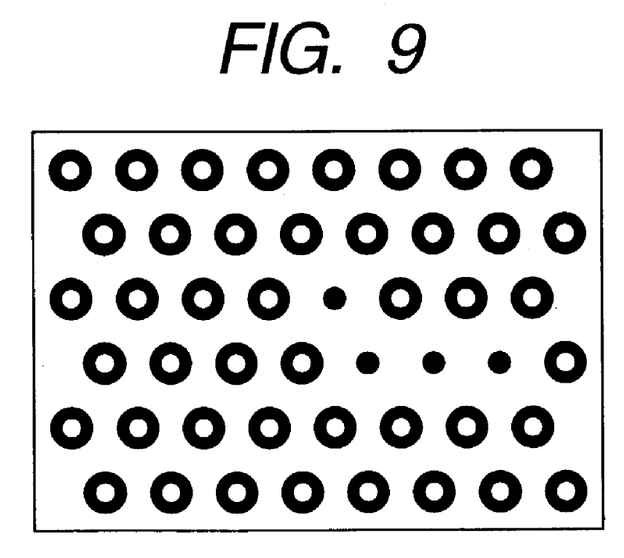
FIG. 9 shows an example of a pattern used in a fourth embodiment.

The pattern to be used is not limited to the pattern in which pattern elements are arranged in a square lattice manner. That is, there may be used a pattern in which the pattern elements are arranged in a equilateral triangular lattice manner. Also, the present invention is not limited to the pattern in which a large number of black circle pattern elements are arranged and a small number of concentric circle pattern elements are arranged between some of the black circle pattern elements. For instance, it is possible to use a pattern in which a large number of concentric circle pattern elements are arranged and a small number of graphite pattern elements are arranged between some of the concentric circle pattern elements. That is, there may be used pattern elements shown in FIG. 9.

Fifth Embodiment

Figure 10:
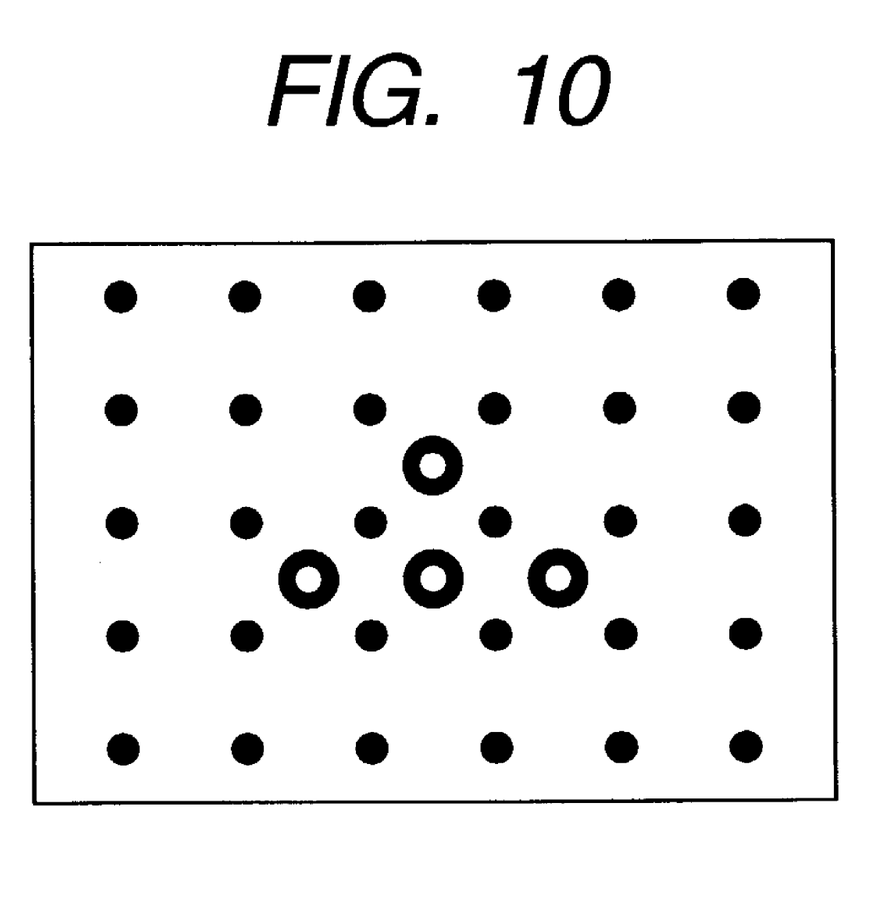
FIG. 10 shows an example of a pattern used in a fifth embodiment.

As to the pattern to be used, there occurs no problem even if not all of pattern elements are used as marks that are actually applied to camera calibration calculation. For instance, there may be used a method in which black circle pattern elements are arranged in a square lattice manner, concentric circle pattern elements are arranged between the black circle pattern elements, the concentric circle pattern elements are used only to specify the picked-up area of the pattern, and only the black circle patterns are applied to the camera calibration calculation. That is, for instance, there may be used a pattern shown in FIG. 10.

Therefore, the above-mentioned embodiments are merely examples in all respects, and should not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. An information processing method of setting one of an internal parameter and an external parameter of a camera, comprising:

acquiring a picked-up image obtained by picking up a calibration pattern in which black pattern elements and black-and-white pattern elements are arranged on a plane using the camera, each of the black pattern elements having a dark closed area in a bright background area, each of the black-and-white pattern elements having a dark closed area and a bright closed area inside the dark closed area;

obtaining a black continuation area and a white continuation area by quantizing the picked-up image;

judging the black pattern elements and the black-and-white pattern elements in the picked-up image based on the black continuation area and the white continuation area which are obtained in said obtaining step; and identifying which of the black-and-white pattern elements, in the calibration pattern, correspond to each of the judged black-and-white pattern elements, based on an arrangement relation of the judged black-and-white pattern elements;

identifying which of the black pattern elements, in the calibration pattern, correspond to each of the judged black pattern elements, based on the arrangement relation of the judged black-and-white pattern elements; and setting at least one of the internal parameter and the external parameter based on correspondence between image coordinate values of the pattern elements on the picked-up image and spatial coordinate values of the pattern elements in a space, the correspondence being obtained by the identifying of the black-and-white pattern elements and the identifying of the black pattern elements, wherein the calibration pattern includes three or more black-and-white pattern elements arranged on a line and a black-and-white pattern element arranged at a position perpendicular to the line.

2. An information processing method according to claim 1, wherein each of the black pattern elements is a black circle area, and each of the black-and-white pattern elements is a black circle area and is a pattern element having a concentric white circle area inside the black circle area.

3. An information processing method according to claim 1, wherein if center-of-gravity points of the black continuation area and the white continuation area are almost the same, these areas are judged as the black-and-white pattern element.

4. An information processing method of setting one of an internal parameter and an external parameter of a camera, comprising:

acquiring a picked-up image obtained by picking up a calibration pattern in which white pattern elements and white-and-black pattern elements are arranged on a plane using the camera, each of the white pattern elements having a bright closed area in a dark background area, each of the white-and-black pattern elements having a bright closed area and a dark closed area inside the bright closed area;

obtaining a white continuation area and a black continuation area by binarizing the picked-up image;

judging between the white pattern elements and the white-and-black pattern elements in the picked-up image based on the white continuation area and the black continuation area which are obtained;

identifying which of the white-and-black pattern elements, in the calibration pattern, correspond to each of the judged white-and-black pattern elements, based on an arrangement relation of the judged white-and-black pattern elements;

identifying which of the white pattern elements, in the calibration pattern, correspond to each of the judged white pattern elements based on the arrangement relation of the judged white-and-black pattern elements; and setting at least one of the internal parameter and the external parameter of the camera based on correspondence between image coordinate values of the pattern elements on the picked-up image and spatial coordinate values of the pattern elements in a space, the correspondence being obtained by the identifying of the white-and-black pattern elements and the identifying of the white pattern elements, wherein the calibration pattern includes three or more white-and-black pattern elements arranged on a line and a white pattern element arranged at a position perpendicular to the line.

5. An information processing method of setting one of an internal parameter and an external parameter of a camera, comprising:

acquiring a picked-up image obtained by picking up a calibration pattern in which first pattern elements and second pattern elements are arranged using the camera, each of the first pattern elements being expressed by two closed areas having different brightness, each of the second pattern elements being expressed by one closed area;

quantizing a signal expressing brightness in the picked-up image and detecting the first pattern elements and the second pattern elements based on a result of the quantization;

identifying which of the first pattern elements, in the calibration pattern, correspond to each of the judged first pattern elements based on an arrangement relation of the judged first pattern elements;

identifying which of the second pattern elements, in the calibration pattern, correspond to each of the judged second pattern elements based on the arrangement relation of the judged first pattern elements; and setting at least one of the internal parameter and the external parameter of the camera based on correspondence between image coordinate values of the pattern elements on the picked-up image and spatial coordinate values of the pattern elements in a space, the correspondence being obtained by the identifying of the first pattern elements and the identifying of the second pattern elements, wherein the calibration pattern includes three or more first pattern elements arranged on a line and a first pattern element arranged at a position perpendicular to the line.

6. A program stored on a computer-readable storage medium for realizing the information processing method according to claim 1.

7. A computer-readable storage medium that stored a program for realizing the information processing method according to claim 1.

8. An information processing apparatus that sets one of an internal parameter and an external parameter of a camera, comprising:

a calibration pattern in which black pattern elements and black-and-white pattern elements are arranged on a plane using the camera, each of the black pattern elements being expressed by a dark closed area in a bright background area, each of the black-and-white pattern elements being expressed by a dark closed area and a bright closed area inside the dark closed area;

an acquisition unit that acquires a picked-up image obtained by picking up the calibration pattern using the camera;

a detecting unit that quantizes a signal expressing brightness in the picked-up image and detects the black pattern elements and the black-and-white pattern elements based on a result of the quantization and that obtains a black continuation area and a white continuation area as a result of the quantization;

a judging unit that judges the black pattern elements and the black-and-white pattern elements in the picked-up image based on the black continuation area and the white continuation area;

a unit that identifies which of the black-and-white pattern elements, in the calibration pattern, correspond to each of the judged black-and-white pattern elements, based on an arrangement relation of the judged black-and-white pattern elements;

a unit that identifies which of the black pattern elements, in the calibration pattern, correspond to each of the judged black pattern elements, based on the arrangement relation of the judged black-and-white pattern elements; and a setting unit that sets at least one of the internal parameter and the external parameter of the camera based on correspondence between image coordinate values of the pattern elements on the picked-up image and spatial coordinate values of the pattern elements in a space, the correspondence being obtained by the identifying of the black-and-white pattern elements and the identifying of the black pattern elements, wherein the calibration pattern includes three or more black-and-white pattern elements arranged on a line and a black-and-white pattern element arranged at a position perpendicular to the line.

* * * * *

UNITED STATES PATENT AND TRADEMARK OFFICE
CERTIFICATE OF CORRECTION

PATENT NO. : 7,196,721 B2  Page 1 of 1
APPLICATION NO. : 10/357340
DATED : March 27, 2007
INVENTOR(S) : Shinji Uchiyama It is certified that error appears in the above-identified patent and that said Letters Patent is hereby corrected as shown below:

ON THE TITLE PAGE, AT ITEM (56), References Cited, Other Publications:
Line 2, "using" should read --Using--.

Signed and Sealed this

Fifth Day of August, 2008

JON W. DUDAS
*Director of the United States Patent and Trademark Office*